US012323867B2

(12) United States Patent
Joshi et al.

(10) Patent No.: US 12,323,867 B2
(45) Date of Patent: Jun. 3, 2025

(54) CONTROL OF TEMPORARY INTER-RAT MEASUREMENT STOP

(71) Applicant: Telefonaktiebolaget LM Ericsson (publ), Stockholm (SE)

(72) Inventors: Varun Prabhu Joshi, Düsseldorf (DE); Miruna-Teodora Wiszniewski, Kaarst (DE); Markus Schneider, Düsseldorf (DE)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 406 days.

(21) Appl. No.: 18/012,803

(22) PCT Filed: Jun. 30, 2020

(86) PCT No.: PCT/EP2020/068368
§ 371 (c)(1),
(2) Date: Dec. 23, 2022

(87) PCT Pub. No.: WO2022/002365
PCT Pub. Date: Jan. 6, 2022

(65) Prior Publication Data
US 2023/0262551 A1 Aug. 17, 2023

(51) Int. Cl.
*H04W 36/14* (2009.01)
*H04L 43/16* (2022.01)
(Continued)

(52) U.S. Cl.
CPC ......... *H04W 36/0094* (2013.01); *H04L 43/16* (2013.01); *H04W 36/0088* (2013.01);
(Continued)

(58) Field of Classification Search
CPC ....... H04W 36/00698; H04W 36/0085; H04W 36/0088; H04W 36/0094; H04W 36/36; H04W 52/0209
(Continued)

(56) References Cited

U.S. PATENT DOCUMENTS

| 2018/0352492 A1* | 12/2018 | Dang ................ H04W 36/0085 |
| 2020/0137819 A1 | 4/2020 | Shi et al. |
| 2022/0110032 A1* | 4/2022 | Zheng ............... H04W 36/0085 |

FOREIGN PATENT DOCUMENTS

| CN | 102869025 A | 1/2013 |
| WO | 2019106575 A1 | 6/2019 |

OTHER PUBLICATIONS

"Inter-RAT NR measurements in 36.133 for EN-DC", 3GPP TSG-RAN WG4 Meeting # 90, R4-1900946, Athens, Greece, Feb. 25-Mar. 1, 2019, pp. 1-5.
(Continued)

*Primary Examiner* — Harun Chowdhury
(74) *Attorney, Agent, or Firm* — Weisberg I.P. Law. P.A.

(57) ABSTRACT

A wireless device (10) sets up a first radio connection to a first access node (101-1, 101-2) of the wireless communication network. The first radio connection is based on a first radio technology. The wireless device (10) measures first signal strengths of reference signals from access nodes (101-1, 101-2) operating on the basis of the first radio technology. Further, the wireless device (10) measures second signal strengths of reference signals from one or more second access nodes (101-3, 101-4) which operate on the basis of a second radio technology. In response to the measured second signal strengths satisfying a first set of conditions, the wireless device (10) sends a first type of measurement report to the first access node. In response to expiry of a time interval without having sent the first type of measurement report, the wireless device (10) stops the
(Continued)

measuring of the second signal strengths. In response to the measured first signal strengths satisfying a second set of conditions, the wireless device (10) sends a second type of measurement report to the first access node (101-1, 101-2). In response to the sending of the second type of measurement report, the wireless device receives (10) configuration information for restarting said measuring of the second signal strengths from the first access node (101-1, 101-2).

20 Claims, 10 Drawing Sheets

(51) Int. Cl.
*H04W 36/00* (2009.01)
*H04W 76/16* (2018.01)
*H04B 17/318* (2015.01)
*H04W 88/06* (2009.01)

(52) U.S. Cl.
CPC .......... *H04W 76/16* (2018.02); *H04B 17/318* (2015.01); *H04W 36/00698* (2023.05); *H04W 36/1443* (2023.05); *H04W 88/06* (2013.01)

(58) Field of Classification Search
USPC .............. 370/252, 329, 331; 455/436, 552.1
See application file for complete search history.

(56) References Cited

OTHER PUBLICATIONS

"3GPP TS 36.331 V16.0.0,", 3rd Generation Partnership Project; Technical Specification Group Radio Access Network; Evolved Universal Terrestrial Radio Access (E-UTRA); Radio Resource Control (RRC); Protocol specification (Release 16), Mar. 2020, pp. 1-1048.

"3GPP TS 38.331 V16.0.0", 3rd Generation Partnership Project; Technical Specification Group Radio Access Network; NR; Radio Resource Control (RRC) protocol specification (Release 16), Mar. 2020, pp. 1-835.

"Remaining issues for Inter-RAT measurement from LTE to NR for both SA and NSA", Ericsson, 3GPP TSG-RAN WG2 #99, R2-1708021, Berlin, Germany, Aug. 21-25, 2017, pp. 1-4.

* cited by examiner

```
message c1 : rrcConnectionReconfiguration : {
        reportConfigId 1,
         reportConfig reportConfigInterRAT : {
          triggerType event : {
            eventId eventB1_NR_r15 : {
              b1-ThresholdNR-r15 nr_RSRP_r15 : 41,
              reportOnLeave-r15 FALSE
            },
            hysteresis 0,
            timeToTrigger ms40
          },
          maxReportCells 4,
          reportInterval ms120,
          reportAmount infinity,
          reportQuantityCellNR-r15 {
            ss-rsrp TRUE,
            ss-rsrq TRUE,
            ss-sinr FALSE
          }
        } reportConfigId 2,
        reportConfig reportConfigEUTRA : {
          triggerType event : {
            eventId eventA7 : {
              a7-Offset : 5
              reportOnLeave : false
              timeToTrigger : ms480
              }
              triggerQuantity : rsrp
              reportQuantity : rsrp
              maxReportCells : 1
              reportInterval : ms480
              reportAmount : infinity

```
A7 Measurement Report
c1 : measurementReport-r8
measurementReport-r8
 measResults
   measId : 8
   rsrpResult : 76
```

FIG. 5B

CONTROL OF TEMPORARY INTER-RAT MEASUREMENT STOP

TECHNICAL FIELD

The present invention relates to methods for controlling measurement reporting in a wireless communication network and to corresponding devices, systems, and computer programs.

BACKGROUND

For the 5G (5th Generation) NR (New Radio) technology specified by 3GPP, one option is to utilize a NSA (Non-Stand Alone) deployment in which 5G NR network infrastructure is supported by infrastructure based on the 4G (4th Generation) LTE (Long Term Evolution) technology specified by 3GPP.

In the case of NR-NSA operation, a UE (user equipment) may utilize EN-DC (E-UTRA NR Dual connectivity) connects to an eNB, i.e., an access node of LTE technology, which acts as an anchor for connectivity of the UE, and to a gNB, i.e., an access node of the NR technology. For this purpose, the eNB configures the UE to perform an LTE inter-RAT B1 measurement to find a suitable NR cell. The measurement is used to detect acceptable NR coverage before an EN-DC bearer is set up. The event of detecting acceptable NR coverage is referred to as "B1" and involves that signal strength of synchronization signals from a gNB, e.g., measured in terms of RSRP (Reference Signal Received Power) or RSRQ (Reference Signal Received Signal Quality) exceeds a threshold plus a hysteresis value, and for a time-to-trigger interval, remains above the threshold minus the hysteresis value. If these conditions are fulfilled, the UE sends a B1 measurement report to the eNB, and the eNB may then initiate setup of the EN-DC bearer. Details on the B1 event measurements can be found in 3GPP TS 36.331 V16.0.0 (2020-03). The B1 measurement event is configured by the eNB using RRC (Radio Resource Control) signalling, in particular by sending a RRC-Connection-Reconfiguration message.

However, in the above procedure of establishing an EN-DC bearer, it can occur that if the UE cannot find any suitable NR cell, it continue to monitor the NR coverage. This would typically be accomplished according to a periodic schedule, as long as the UE is in connected mode. This continued monitoring of the NR coverage may severely impact battery performance of the UE. Further, when using a configuration where measurement gaps are used in combination with intra/inter-site LTE anchors, such measurements could also have a negative impact on the LTE throughput.

Accordingly, there is a need for techniques which allow for efficiently controlling connectivity of a wireless device to a wireless communication network supporting multiple radio technologies, in particular with respect to efficiently performing measurements.

SUMMARY

According to an embodiment, a method of controlling connectivity to a wireless communication network is provided. According to the method, a wireless device sets up a first radio connection to a first access node of the wireless communication network. The first radio connection is based on a first radio technology. The wireless device measures first signal strengths of reference signals from access nodes operating on the basis of the first radio technology. Further, the wireless device measures second signal strengths of reference signals from one or more second access nodes which operate on the basis of a second radio technology. In response to the measured second signal strengths satisfying a first set of conditions, the wireless device sends a first type of measurement report to the first access node. In response to expiry of a time interval without having sent the first type of measurement report, the wireless device stops the measuring of the second signal strengths. In response to the measured first signal strengths satisfying a second set of conditions, the wireless device sends a second type of measurement report to the first access node. In response to the sending of the second type of measurement report, the wireless device receives configuration information for restarting said measuring of the second signal strengths from the first access node.

According to an embodiment, a method of controlling connectivity to a wireless communication network is provided. According to the method, an access node of the wireless communication network wireless device sets up a first radio connection to a wireless device. The first radio connection is based on a first radio technology. Further, the access node configures the wireless device to measure first signal strengths of reference signals from access nodes operating on the basis of the first radio technology. Further, the access node configures the wireless device to measure second signal strengths of reference signals from one or more further access nodes operating on the basis of a second radio technology. Further, the access node configures the wireless device to, in response to the measured second signal strengths satisfying a first set of conditions, send a first type of measurement report to the access node. Further, the access node configures the wireless device to, in response to expiry of a time interval without having sent the first type of measurement report, stop the measuring of the second signal strengths, and in response to the measured first signal strengths satisfying a second set of conditions, send a second type of measurement report to the access node. In response to receiving the second type of measurement report, the access node configures the wireless device to restart said measuring of the second signal strengths.

According to a further embodiment, a wireless device for operation in a wireless communication network is provided. The wireless device is configured to set up a first radio connection to a first access node of the wireless communication network. The first radio connection is based on a first radio technology. Further, the wireless device is configured to measure first signal strengths of reference signals from access nodes operating on the basis of the first radio technology. Further, the wireless device is configured to measure second signal strengths of reference signals from one or more second access nodes operating on the basis of a second radio technology. Further, the wireless device is configured to, in response to the measured second signal strengths satisfying a first set of conditions, send a first type of measurement report to the first access node. Further, the wireless device is configured to, in response to expiry of a time interval without having sent the first type of measurement report, stop the measuring of the second signal strengths. Further, the wireless device is configured to, in response to the measured first signal strengths satisfying a second set of conditions, send a second type of measurement report to the first access node. Further, the wireless device is configured to, in response to the sending of the second type of measurement report, receive configuration information for restarting the measuring of the second signal strengths from the first access node.

According to a further embodiment, a wireless device for operation in a wireless communication network is provided. The wireless device comprises at least one processor and a memory. The memory contains instructions executable by said at least one processor, whereby the wireless device is operative to set up a first radio connection to a first access node of the wireless communication network, the first access node operating on the basis of a first radio technology. Further, the memory contains instructions executable by said at least one processor, whereby the wireless device is operative to measure first signal strengths of reference signals from access nodes operating on the basis of the first radio technology. Further, the memory contains instructions executable by said at least one processor, whereby the wireless device is operative to measure second signal strengths of reference signals from one or more second access nodes operating on the basis of a second radio technology. Further, the memory contains instructions executable by said at least one processor, whereby the wireless device is operative to, in response to the measured second signal strengths satisfying a first set of conditions, send a first type of measurement report to the first access node. Further, the memory contains instructions executable by said at least one processor, whereby the wireless device is operative to, in response to expiry of a time interval without having sent the first type of measurement report, stop the measuring of the second signal strengths. Further, the memory contains instructions executable by said at least one processor, whereby the wireless device is operative to, in response to the measured first signal strengths satisfying a second set of conditions, send a second type of measurement report to the first access node. Further, the memory contains instructions executable by said at least one processor, whereby the wireless device is operative to, in response to the sending of the second type of measurement report, receive configuration information for restarting the measuring of the second signal strengths from the first access node.

According to a further embodiment, an access node for a wireless communication network is provided. The access node is configured to set up a first radio connection to a wireless device. The first radio connection is based on a first radio technology. Further, the access node is configured to configure the wireless device to measure first signal strengths of reference signals from access nodes operating on the basis of the first radio technology. Further, the access node is configured to configure the wireless device to measure second signal strengths of reference signals from one or more further access nodes operating on the basis of a second radio technology. Further, the access node is configured to configure the wireless device to, in response to the measured second signal strengths satisfying a first set of conditions, send a first type of measurement report to the access node. Further, the access node is configured to configure the wireless device to, in response to expiry of a time interval without having sent the first type of measurement report, stop said measuring of the second signal strengths and, in response to the measured first signal strengths satisfying a second set of conditions, send a second type of measurement report to the access node. Further, the access node is configured to, in response to receiving the second type of measurement report, configure the wireless device to restart said measuring of the second signal strengths.

According to a further embodiment, an access node for a wireless communication network is provided. The access node comprises at least one processor and a memory. The memory contains instructions executable by said at least one processor, whereby the access node is operative to set up a first radio connection to a wireless device. The first radio connection is based on a first radio technology. Further, the memory contains instructions executable by said at least one processor, whereby the access node is operative to configure the wireless device to measure first signal strengths of reference signals from access nodes operating on the basis of the first radio technology. Further, the memory contains instructions executable by said at least one processor, whereby the access node is operative to configure the wireless device to measure second signal strengths of reference signals from one or more further access nodes operating on the basis of a second radio technology. Further, the memory contains instructions executable by said at least one processor, whereby the access node is operative to configure the wireless device to, in response to the measured second signal strengths satisfying a first set of conditions, send a first type of measurement report to the access node. Further, the memory contains instructions executable by said at least one processor, whereby the access node is operative to configure the wireless device to, in response to expiry of a time interval without having sent the first type of measurement report, stop said measuring of the second signal strengths and, in response to the measured first signal strengths satisfying a second set of conditions, send a second type of measurement report to the access node. Further, the memory contains instructions executable by said at least one processor, whereby the access node is operative to, in response to receiving the second type of measurement report, configure the wireless device to restart said measuring of the second signal strengths.

According to a further embodiment of the invention, a computer program or computer program product is provided, e.g., in the form of a non-transitory storage medium, which comprises program code to be executed by at least one processor of a wireless device for operation in a wireless communication network. Execution of the program code causes the wireless device to set up a first radio connection to a first access node of the wireless communication network. The first radio connection is based on a first radio technology. Further, execution of the program code causes the wireless device to measure first signal strengths of reference signals from access nodes operating on the basis of the first radio technology. Further, execution of the program code causes the wireless device to measure second signal strengths of reference signals from one or more second access nodes operating on the basis of a second radio technology. Further, execution of the program code causes the wireless device to, in response to the measured second signal strengths satisfying a first set of conditions, send a first type of measurement report to the first access node. Further, execution of the program code causes the wireless device to, in response to expiry of a time interval without having sent the first type of measurement report, stop the measuring of the second signal strengths. Further, execution of the program code causes the wireless device to, in response to the measured first signal strengths satisfying a second set of conditions, send a second type of measurement report to the first access node. Further, execution of the program code causes the wireless device to, in response to the sending of the second type of measurement report, receive configuration information for restarting the measuring of the second signal strengths from the first access node.

According to a further embodiment of the invention, a computer program or computer program product is provided, e.g., in the form of a non-transitory storage medium, which comprises program code to be executed by at least one processor of an access node for a wireless communication network. Execution of the program code causes the access node to set up a first radio connection to a wireless device. The first radio connection is based on a first radio technology. Further, execution of the program code causes the access node to configure the wireless device to measure first signal strengths of reference signals from access nodes operating on the basis of the first radio technology. Further, execution of the program code causes the access node to configure the wireless device to measure second signal strengths of reference signals from one or more further access nodes operating on the basis of a second radio technology. Further, execution of the program code causes the access node to configure the wireless device to, in response to the measured second signal strengths satisfying a first set of conditions, send a first type of measurement report to the access node. Further, execution of the program code causes the access node to configure the wireless device to, in response to expiry of a time interval without having sent the first type of measurement report, stop said measuring of the second signal strengths and, in response to the measured first signal strengths satisfying a second set of conditions, send a second type of measurement report to the access node. Further, execution of the program code causes the access node to, in response to receiving the second type of measurement report, configure the wireless device to restart said measuring of the second signal strengths.

Details of such embodiments and further embodiments will be apparent from the following detailed description of embodiments.

BRIEF DESCRIPTION OF THE DRAWINGS

FIGS. 5A and 5B show examples of messages according to an embodiment.

DETAILED DESCRIPTION OF EMBODIMENTS

In the following, concepts in accordance with exemplary embodiments of the invention will be explained in more detail and with reference to the accompanying drawings. The illustrated embodiments relate to connectivity management in a wireless communication network, in particular with respect to establishing dual-connectivity based on a first radio access technology (RAT) and a second RAT. In the illustrated concepts, these two RATs are assumed to be the LTE RAT and the NR RAT specified by 3GPP. However, it is noted that the concepts could also be applied to other combinations of RATs.

The illustrated concepts are based on first setting up a radio connection based on the first RAT, and then using inter-RAT measurements to control establishment of an additional radio connection based on the second RAT. These inter RAT-measurements may be measurements as specified in 3GPP TS 36.331 V16.0.0 for the B1 event. In order to enable efficient monitoring of availability of the second RAT, a UE may temporarily stop the inter-RAT measurements and use intra-RAT measurements are used for controlling restarting of the inter-RAT measurements. For this purpose, a corresponding measurement event may be defined, which in the following will be denoted as A7 event. In response to detecting the A7 event, the UE sends a corresponding measurement report, and on the basis of this measurement report, the wireless communication network may configure the UE to restart the inter-RAT measurements. Accordingly, the amount of required inter-RAT measurements may be reduced by using the intra-RAT measurements to detect changes in the UE's radio environment and restart the inter-RAT measurements in response to such changes. It is noted that since the above-mentioned measurement reports are triggered by events defined on the basis of measurements, they may also be referred to as event-triggered measurement or simply event reports.

Figure 1:
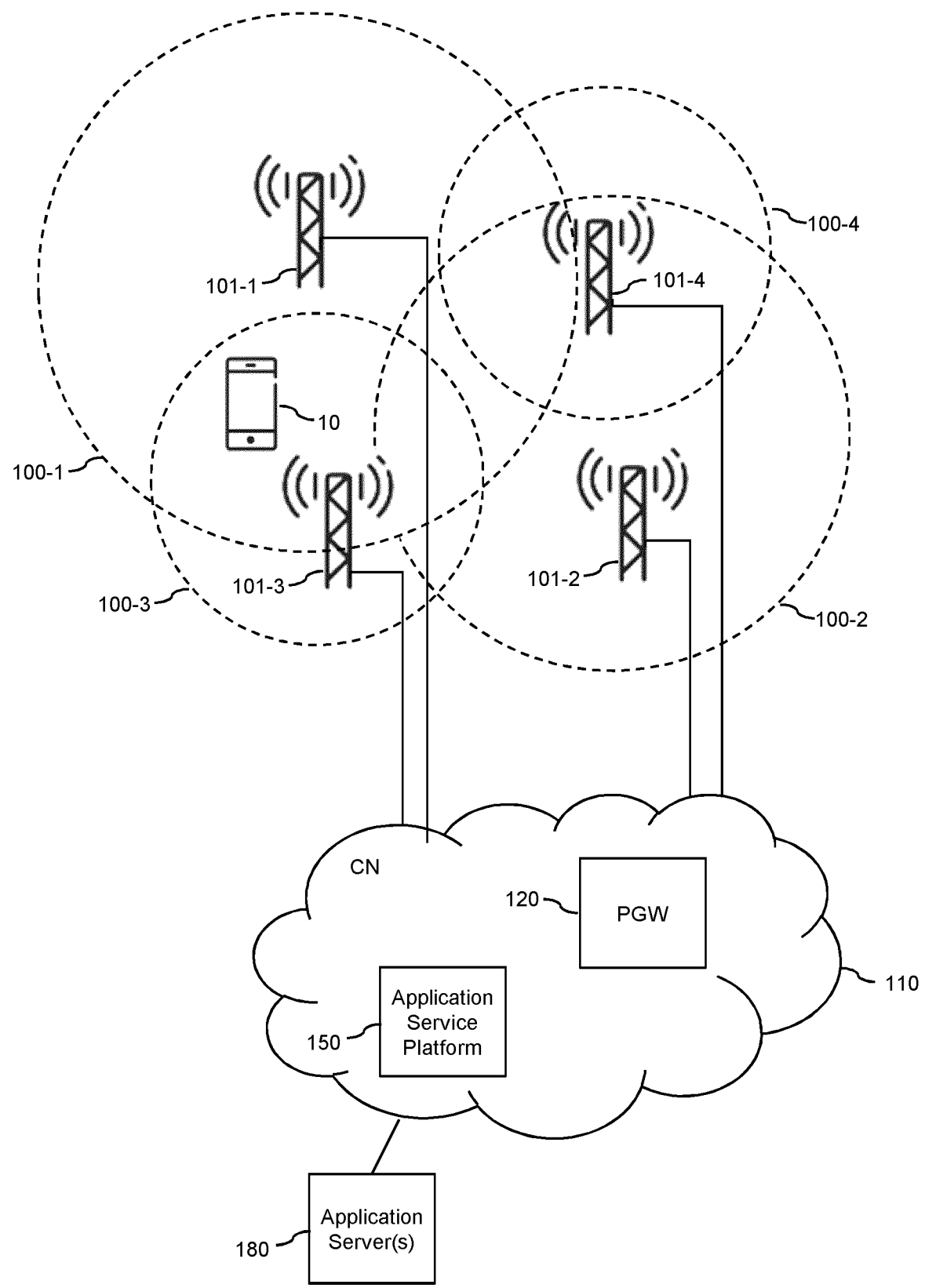
FIG. 1 schematically illustrates a wireless communication network according to an embodiment.

FIG. 1 illustrates an exemplary wireless communication network according to an embodiment. In the illustrated example, the wireless communication network covers multiple cells 100-1, 100-2, 100-3, 100-4, each cell being served by a corresponding access node 101-1, 101-2, 101-3, 101-4. The access nodes 101-1, 101-2, 101-3, 101-4 correspond to eNBs of the LTE technology or to gNBs of the NR technology. More specifically, the example of FIG. 1 assumes that the access nodes 101-1, 101-2, 101-3, 101-4 operate on the basis of two different radio technologies, with the access nodes 101-1 and 101-2 being to eNBs operating on the basis of the LTE radio technology, and the access nodes 101-3 and 101-4 being gNBs operating on the basis of the NR radio technology.

By way of example, FIG. 1 further a illustrates UE 10 which may connect to the wireless communication network. The UEs 10 may correspond to various kinds of wireless devices, for example user terminals, such as mobile or stationary computing devices like smartphones, laptop computers, desktop computers, tablet computers, gaming devices, or the like. Further, the UEs 10s could for example correspond to other kinds of equipment like smart home devices, printers, multimedia devices, data storage devices, or the like.

In the example of FIG. 1, the UEs 10 may connect through a first radio connection to one of the access 101-1, 101-2. The first radio connection is thus based on the LTE radio technology. For example depending on location or channel conditions experienced by a UE 10, an appropriate cell 100-1, 100-2 and access node 101-1, 101-2 may be selected for establishing the first radio connection. Under certain conditions, in particular if there is NR coverage by one of the access nodes 101-3, 101-4 at the position of the UE 10, the UE 10 may further establish an additional radio connection to one of the access nodes 101-3 or 101-4, to thereby set up a EN-DC connection between the UE 10 and the wireless communication network. Otherwise, the UE 10 may utilize normal connectivity to only one of the access nodes 101-1, 101-2. The cells 100-1, 100-2 may thus act as LTE anchor cells. A data link between the UE 10 and the wireless communication network may thus be based on a single-connectivity configuration using only the first radio connection or on an EN-DC configuration additionally using an NR based radio connection to one of the access nodes 101-3, 101-4.

As further illustrated, the access nodes 101-1, 101-2, 101-3, 101-4 may be further connected to a core network (CN) 110 of the wireless communication network. The illustrated example assumes an NR-NSA deployment, where the CN 110 corresponds to an EPC (Evolved Packet Core) of the LTE technology further supporting NR radio access through the access nodes 101-3, 101-4. The CN 110 may ensure data connectivity of the UE 10 with other UEs connected to the wireless communication network (not illustrated) as well as data connectivity of the UE 10 to other entities, e.g., to one or more servers, service providers, data sources, data sinks, user terminals, or the like. For this purpose, the CN 110 may include one or more gateways 120, e.g., an SGW (Serving Gateway) and/or PGW (Packet Data Network) of the LTE technology. Accordingly, the radio connection established between the UE 10 and the wireless communication network may be used for providing various kinds of services to the UE 10, e.g., a voice service, a multimedia service, or other data service. Such services may be based on applications which are executed on the UE 10 and/or on a device linked to the UE 10. By way of example, FIG. 1 illustrates an application service platform 150 provided in the CN 110 and one or more application servers 180 connected to the CN 110. The application(s) executed on the UE 10 and/or on one or more other devices linked to the UE 10 may use the data link of the UE 10 for data communication with one or more other UEs 10 and/or the application service platform 150, thereby enabling utilization of the corresponding service(s) at the UE 10.

Figure 2:
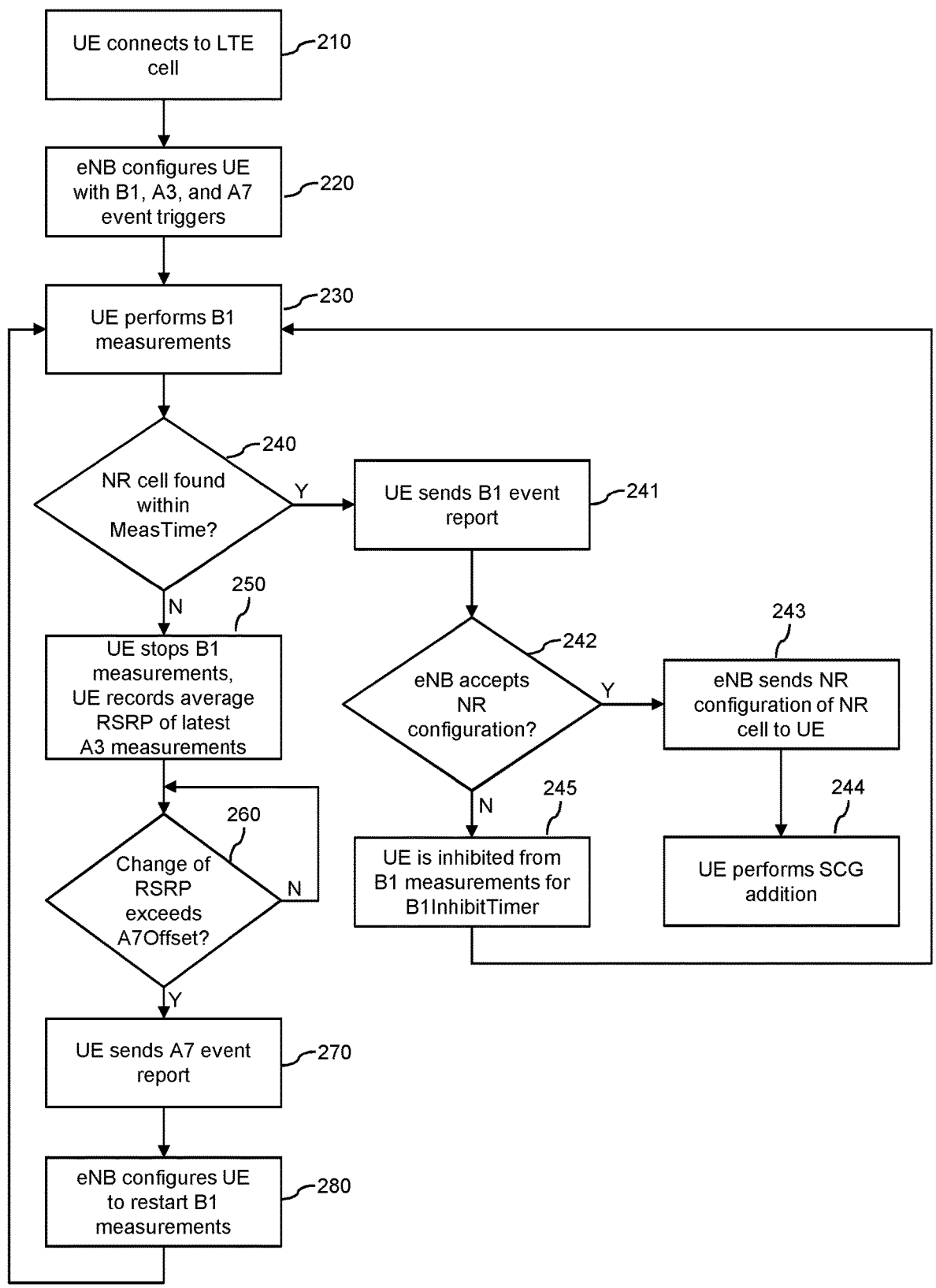
FIG. 2 shows a flowchart for illustrating a connection management procedure according to an embodiment.

FIG. 2 schematically illustrates a connectivity management procedure which is based on the illustrated concepts. The procedure of FIG. 2 may be performed by an EN-DC capable UE, e.g., the UE 10, and an eNB, e.g., corresponding to one of the access nodes 101-1, 101-2.

At block 210, the UE connects to the LTE cell served by the eNB and establishes the first radio connection.

At block 220, the eNB configures measurements to be performed by the UE. In particular, the eNB configures the UE perform intra-RAT measurements with respect to the NR RAT and defines a corresponding LTE-NR B1 event. Further, the eNB configures the UE to perform intra-RAT measurements with respect to the LTE RAT and configures the UE with a corresponding A3 event and a corresponding A7 event. As for example described in 3GPP TS 36.331 V16.0.0, the A3 event involves performing measurements for detecting whether a neighbor cell of provides better LTE coverage than the cell to which the UE is currently connected. Configuring the measurements and events may be accomplished by an RRC Connection Reconfiguration procedure.

At block 230, the UE performs the B1 measurements according to the measurement configuration defined at block 220. This involves that the UE measures reference signals, in particular synchronization signals of NR cells. In particular, the UE measures the RSRP or RSRQ of such synchronization signals.

At block 240, the UE checks if an NR cell is found within a time interval denoted as MeasTime. This time interval is defined by the measurement configuration of the A7 event configured at block 230. The UE decides that an NR cell is found if the measured signal strength of the synchronization signal of an NR cell exceeds a first threshold plus a hysteresis value, and, for a time-to-trigger interval defined by a parameter denoted as TimeToTriggerB1, remains above the threshold minus the hysteresis value. The first threshold may be an RSRP by a parameter denoted as B1ThresholdRSRP, or may be an RSRQ, defined by a parameter denoted as B1ThresholdRSRQ. These parameters are defined at block 230 in the measurement configuration of the B1 event. If these conditions are fulfilled, as indicated by branch "Y" from block 240, the UE sends a B1 event report to the eNB, as indicated by block 241, and the eNB may then initiate setup of an EN-DC bearer. In particular, if the eNB accepts an NR configuration with an additional NR cell as indicated by the B1 event report, as indicated by branch "Y" from block 242, the eNB sends a corresponding NR configuration to the UE, as indicated by block 243, and the UE will perform SCG (Secondary Cell Group) addition of the NR cell, as indicated by block 244. If the eNB does not accept the NR configuration, as indicated by branch "N" from block 242, the UE will be temporarily inhibited from performing further inter-RAT measurements for the B1 event, for a duration defined by a parameter denoted as InhibitTimer. This parameters is defined at block 230 in the measurement configuration of the B1 event.

If no NR cell is found within the time interval MeasTime and thus no B1 event report triggered in this time interval, as indicated by branch "N" from block 240, the UE stops the B1 inter-RAT measurements and records an average RSRP of the latest A3 intra-RAT measurements. Existing measurement filters of the A3 event may be reused for the A7 event, e.g., by using the LTE RSRP measured for the A3 event as a current RSRP value for the A7 event. The UE may average the value of the current RSRP over a time interval defined by a parameter denoted as tWaitRSRP and record this average value as A7MeasRSRP. The parameter tWaitRSRP may be defined by the measurement configuration of the A7 event configured at block 230.

At block 260 the UE then continuously checks if the change of the current RSRP exceeds a value defined by a parameter denoted as A7-Offset. The parameter A7-Offset may be defined by the measurement configuration of the A7 event configured at block 230. For this purpose the UE may calculate the absolute difference of the current RSRP and the recorded value of A7MeasRSRP and check if this difference exceeds A7Offset for a time interval defined by a parameter denoted as TimeToTriggerA7. The parameter TimeToTriggerA7 may be defined by the measurement configuration of the A7 event configured at block 230. If this is the case, as indicated by branch "Y" from block 260, the UE sends an A7 event report. Otherwise, the UE repeats the check of block 260, as indicated by branch "N" from block 260. As indicated by block 280, the eNB receives the A7 report and configures the UE to restart the B1 measurements. In this configuration process, the eNB can for example consider measurement gaps used by the UE for performing the B1 measurements. The eNB may thus efficiently adapt future scheduling processes to these measurement gaps.

The procedure then returns to block 230, where the UE again performs the B1 measurements.

Figure 3:
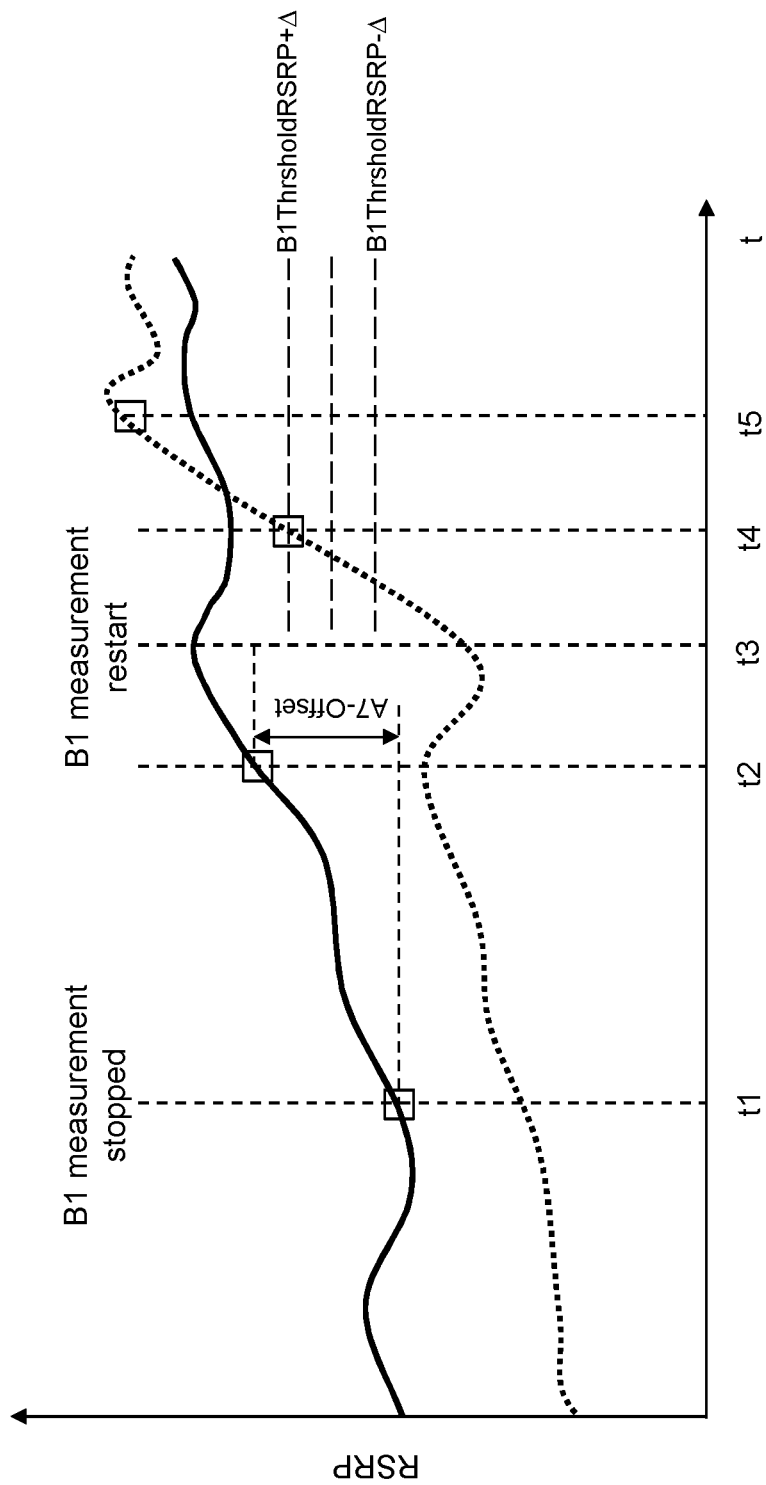
FIG. 3 shows an example of signal strength measurements in a connection management procedure according to an embodiment.

FIG. 3 shows exemplary courses of signal strengths which may occur in the above procedure. In FIG. 3, a solid line denotes the RSRP for the LTE RAT, and a dotted line denotes the RSRP for the NR RAT. At time t1, the time interval defined by the parameter MeasTime expires without sending of a B1 event report, the UE records the average value of the latest LTE RSRP measurements, i.e., the above-mentioned value A7MeasRSRP, and the UE stops measuring the RSRP for the NR RAT. At time t2, the change of the LTE RSRP as compared to the stored value A7MeasRSRP exceeds the value defined by the parameter A7-Offset. At t3, the UE finds that the change of the LTE RSRP has remained above A7-Offset for a time defined by the parameter TimeToTriggerA7, sends the A7 event report, and is configured to restart measuring the RSRP for the NR RAT. At t4, the RSRP for the NR RAT exceeds the threshold defined by the parameter B1ThresholdRSRP plus the corresponding hysteresis value. At time t5 the UE finds that the NR RSRP has remained above B1ThresholdRSRP minus the corresponding hysteresis value for a time defined by the parameter TimeToTriggerB1, and sends the B1 event report.

As can be seen from the examples of FIGS. 2 and 3, the illustrated concepts allow for efficiently controlling the LTE-NR B1 measurement configuration by stopping the LTE-NR B1 measurements and using the A7 event to initiate restarting the LTE-NR B1 measurements. Further, no extra measurement gaps are needed while UE is connected only via the LTE RAT and the B1 measurements are stopped. The intra-RAT measurements may be efficiently reused as an indicator of a probability of changes in the NR signal strengths that would be measured by the UE.

Figure 4:
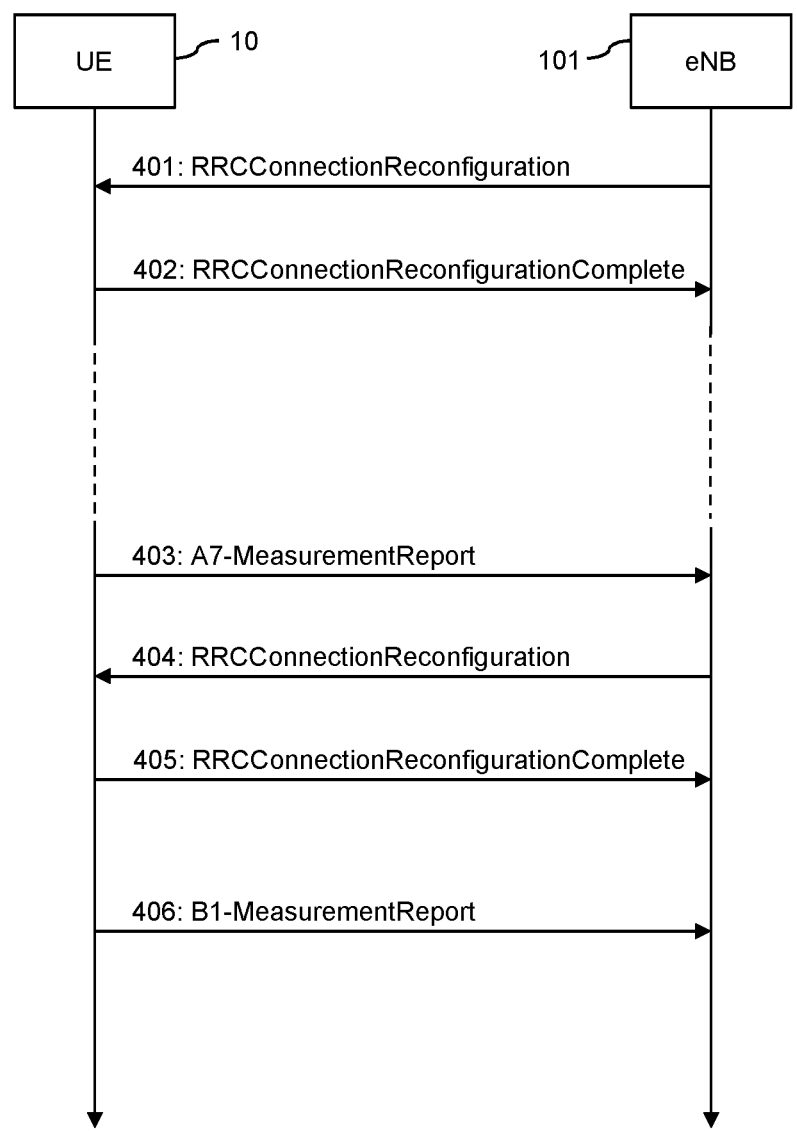
FIG. 4 shows an example of signalling processes according to an embodiment.

FIG. 4 shows an example of signalling processes in the above procedure. The processes involve a UE 10 and an eNB 101, e.g., corresponding to the UE 10 and one of the access nodes 101-1 or 101-2 of FIG. 1.

In the processes of FIG. 4, the eNB 101 sends a RRCConnectionReconfiguration message 401 to the UE 10. The RRCConnectionReconfiguration message 401 includes information for configuring the measurements to performed by the UE 10 and the reporting of such measurements. In particular, the RRCConnectionReconfiguration message 401 may configure the UE 10 for measurements and reporting of the above-mentioned A7 event and B1 event. An example of contents of a corresponding RRCConnectionReconfiguration message is shown in FIG. 5A. In this example, the parameter A7-Offset is set to 5, and the parameter TimeToTriggerA7 is set to 480 ms. In some scenarios, the RRCConnectionReconfiguration message 401 may also include information for configuring measurements and reporting of the above-mentioned A3 event. In other scenarios, the measurements and reporting of the A3 event could be configured separately, e.g., in an earlier RRCConnectionReconfiguration message. The UE 10 responds to the eNB 101 with an RRCConnectionReconfigurationComplete message 402, thereby acknowledging successful configuration of the measurements and related reporting.

At a later time, after having stopped the B1 measurements in accordance with the above procedure, the UE 10 sends an A7-MeasurementReport message 403 to the eNB 101. An example of contents of a corresponding A7-MeasurmentReport message is shown in FIG. 5B. The A7-MeasurementReport message 403 indicates that the measured change of the LTE RSRP exceeded the value defined by the parameter A7-Offset for a duration defined by the parameter TimeToTriggerA7. As further shown in FIG. 5B, the A7-MeasurementReport message 403 may also indicates the measured LTE RSRP.

In response to the A7-MeasurementReport message 403, the eNB 101 sends a further RRCConnectionReconfiguration message 404 to the UE 10. The RRCConnectionReconfiguration message 404 configures the UE 10 to restart the B1 measurements. For this purpose the RRCConnectionReconfiguration message 404 may reconfigure the measurements and reporting performed by the UE 10. The RRCConnectionReconfiguration message 404 may have similar contents as the RRCConnectionReconfiguration message 401 and may also reconfigure the measurements an reporting of the A7 event.

In the example of FIG. 4, it is assumed that the restarted B1 measurements result in detection of an NR cell that meets the conditions defined for the B1 event, which triggers the UE 10 to send a B1-MeasurementReport message 406 to the eNB 101. Based on the B1-MeasurementReport message 406, the eNB 101 may then initiate establishment of an additional radio connection to the detected NR cell and establishment of an EN-DC bearer between the UE 10 and the wireless communication network.

Figure 6:
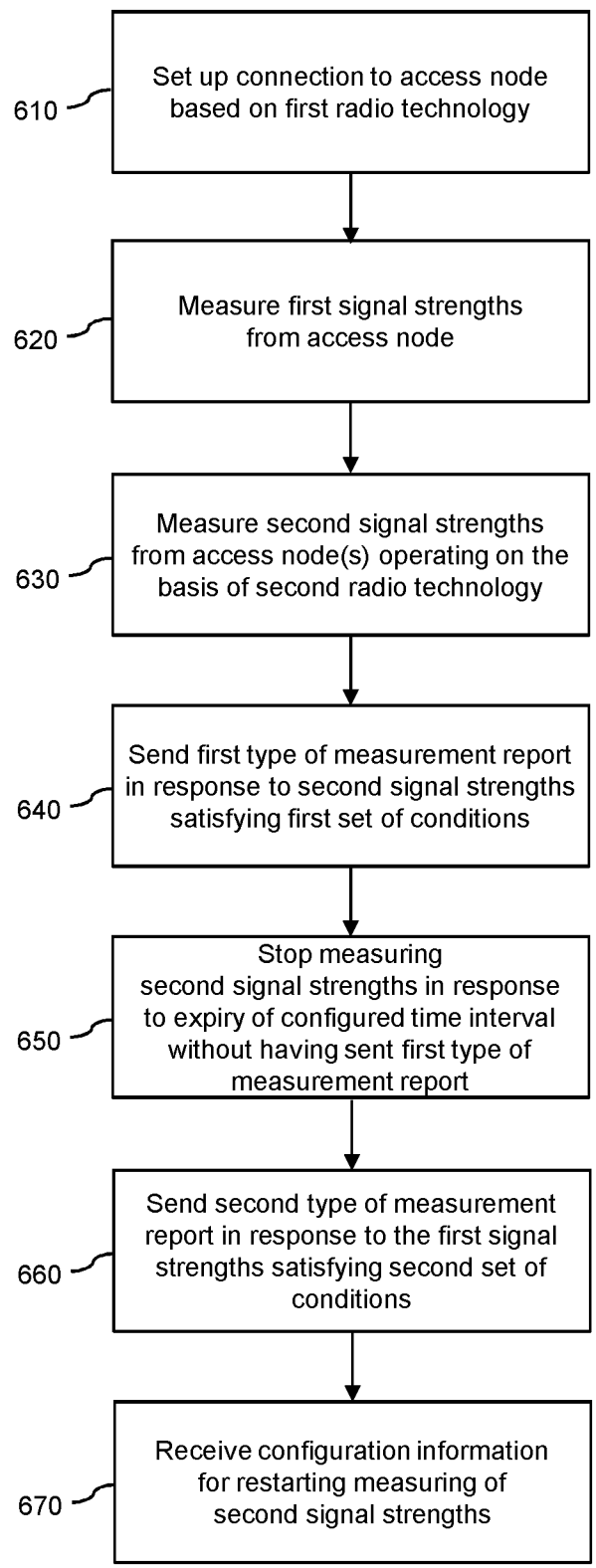
FIG. 6 shows a flowchart for schematically illustrating a method according to an embodiment.

FIG. 6 shows a flowchart for illustrating a method, which may be utilized for implementing the illustrated concepts. The method of FIG. 6 may be used for implementing the illustrated concepts in a wireless device for operation in a wireless communication network. The wireless device may for example correspond to the above-mentioned UE 10.

If a processor-based implementation of the wireless device is used, at least some of the steps of the method of FIG. 6 may be performed and/or controlled by one or more processors of the wireless device. Such wireless device may also include a memory storing program code for implementing at least some of the below described functionalities or steps of the method of FIG. 6.

At step 610, the wireless device sets up a first radio connection to a first access node of the wireless communication network. The first radio connection is based on a first radio technology. The first radio technology may for example correspond to the above-mentioned LTE RAT. The first access node may correspond to one of the above-mentioned access nodes 101-1, 101-2, or 101.

At step 620, the wireless device measures first signal strengths of reference signals from access nodes operating on the basis of the first radio technology. These access nodes may include the first access node and one or more neighboring access nodes of the first access node. The wireless device may measure the first signal strengths in terms of an RSRP or an RSRQ. The measurement of the first signal strengths may have the purpose of assessing signal quality from neighboring cells in relation to signal quality from the cell to which the wireless device is currently connected. An example of the measurement of the first signal strengths is the above-mentioned measurement of the LTE RSRP for the A3 event and the A7 event.

At step 630, the wireless device measures second signal strengths of reference signals from one or more second access nodes. The wireless device may measure the second signal strengths in terms of an RSRP or an RSRQ. The one or more second access nodes operate on the basis of a second radio technology. The second radio technology may for example correspond to the NR RAT. The measurement of the second signal strengths may have the purpose of assessing signal quality from cells of the second radio technology in order to control establishment of a radio connection based on the second radio technology. The radio connection based on the second radio technology may be established in addition to the first radio connection, e.g., as part of a dual connectivity configuration. An example of the measurement of the second signal strengths is the above-mentioned measurement of the NR RSRP for the B1 event.

At step 640, in response to the measured second signal strengths satisfying a first set of conditions, the wireless device sends a first type of measurement report to the first access node. The first set of conditions may involve that the measured second signal strengths exceed a threshold. This threshold may correspond to the threshold defined by above-mentioned parameter B1ThresholdRSRP or B1ThresholdRSRQ. In some scenarios, the first set of conditions may also involve that for a time interval starting when exceeding the threshold, the measured second signal strengths remain above the threshold. In some scenarios, the first set conditions may also define a hysteresis to be applied in connection with the threshold and the time interval. In this case, the first set of conditions may involve that for a time interval starting when exceeding the threshold plus the hysteresis value, the measured second signal strengths remain above the threshold minus the hysteresis value. In some scenarios the hysteresis value may be zero. The time interval of step 640 may correspond to the time interval defined by above-mentioned parameter TimeToTriggerB1.

An example of such first set of conditions are the above-described conditions to be fulfilled in detection of the B1 event.

The first set of conditions may be configured by the first access node, e.g., using an RRC Resource Reconfiguration procedure as explained in connection with FIG. 4. The wireless device may thus receive configuration information indicating the first set of conditions from the first access node.

In some scenarios, in response to the sending of the first type of measurement report, the wireless device may set up a second radio connection to one of the second access nodes. The second radio connection would then be based on the second radio technology. The first radio connection and the second radio connection may then be used in a dual-connectivity configuration for communication between the wireless device and the wireless communication network.

At step 650, in response to expiry of a time interval without having sent the first type of measurement report, the wireless device stops the measuring of the second signal strengths. This time interval may correspond to the time interval defined by the above-mentioned parameter MeasTime. The time interval of step 650 may be configured by the first access node, e.g., using an RRC Resource Reconfiguration procedure as explained in connection with FIG. 4.

At step 660, in response to the measured first signal strengths satisfying a second set of conditions, the wireless device sends a second type of measurement report to the first access node. The second set of conditions may involve that a change of the measured first signal strengths exceeds a further threshold. The further threshold may correspond to the threshold defined by above-mentioned parameter A7Offset. In some scenarios, the second set of conditions may also involve that, for a time interval starting when exceeding the further threshold, the change of the measured first signal strengths remains above the further threshold.

For determining the change of the measured first signal strengths, the wireless device may store a value representing the first signal strengths when stopping the measuring of the second signal strengths and determine the change of the measured first signal strengths based on a difference of the measured first signal strengths to the stored value. The value representing the first signal strengths when stopping the measuring of the second signal strengths may also be based on averaging over a number of the latest measurements of the first signal strengths.

The time interval of step 660 may correspond to the time interval defined by above-mentioned parameter TimeToTriggerA7.

An example of such second set of conditions are the above-described conditions to be fulfilled in detection of the A7 event.

The second set of conditions may be configured by the first access node, e.g., using an RRC Resource Reconfiguration procedure as explained in connection with FIG. 4. The wireless device may thus receive configuration information indicating the second set of conditions from the first access node.

At step 670, in response to the sending of the second type of measurement report, the wireless device receives configuration information for restarting the measuring of the second signal strengths from the first access node, e.g., using an RRC Resource Reconfiguration procedure as explained in connection with FIG. 4.

Figure 8:
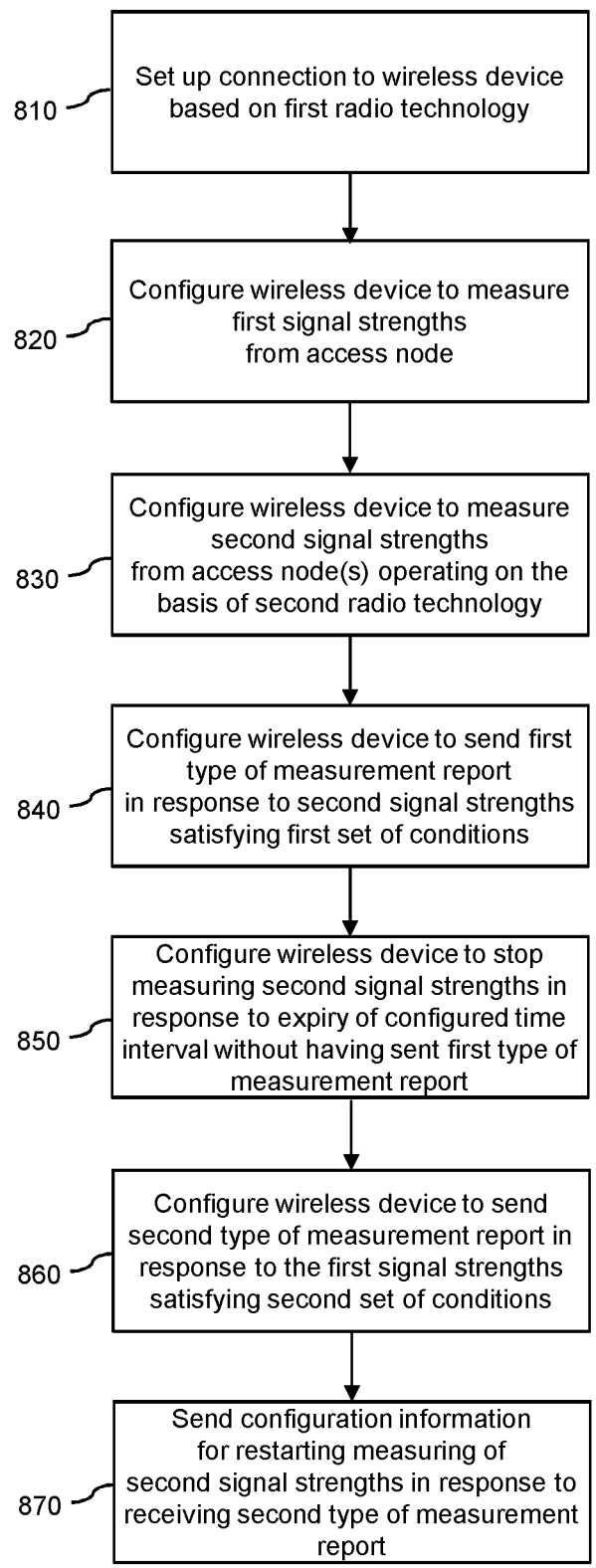
FIG. 8 shows a flowchart for schematically illustrating a further method according to an embodiment.

FIG. 8 shows a flowchart for illustrating a method, which may be utilized for implementing the illustrated concepts. The method of FIG. 8 may be used for implementing the illustrated concepts in an access node of a wireless communication network. The access node may for example correspond to one of the above-mentioned access nodes 101, 101-1, 101-2.

If a processor-based implementation of the access node is used, at least some of the steps of the method of FIG. 8 may be performed and/or controlled by one or more processors of the access node. Such access node may also include a memory storing program code for implementing at least some of the below described functionalities or steps of the method of FIG. 8.

At step 810, the access node sets up a first radio connection to a wireless device. The first radio connection is based on a first radio technology. The first radio technology may for example correspond to the above-mentioned LTE RAT. The first access node may correspond to one of the above-mentioned access nodes 101-1, 101-2, or 101.

At step 820, the access node configures the wireless device to measure first signal strengths of reference signals from access nodes operating on the basis of the first radio technology. These access nodes may include the access node and one or more neighboring access nodes of the access node. The access node may configure the wireless device to measure the first signal strengths in terms of an RSRP or an RSRQ. The measurement of the first signal strengths may have the purpose of assessing signal quality from neighboring cells in relation to signal quality from the cell to which the wireless device is currently connected. An example of the measurement of the first signal strengths is the above-mentioned measurement of the LTE RSRP for the A3 event and the A7 event.

At step 830, the access node configures the wireless device to measure second signal strengths of reference signals from one or more second access nodes. The access node may configure the wireless device to measure the second signal strengths in terms of an RSRP or an RSRQ. The one or more second access nodes operate on the basis of a second radio technology. The second radio technology may for example correspond to the NR RAT. The measurement of the second signal strengths may have the purpose of assessing signal quality from cells of the second radio technology in order to control establishment of a radio connection based on the second radio technology. The radio connection based on the second radio technology may be established in addition to the first radio connection, e.g., as part of a dual connectivity configuration. An example of the measurement of the second signal strengths is the above-mentioned measurement of the NR RSRP for the B1 event.

At step 840, the access node configures the wireless device to, in response to the measured second signal strengths satisfying a first set of conditions, send a first type of measurement report to the access node. The first set of conditions may involve that the measured second signal strengths exceed a threshold. This threshold may correspond to the threshold defined by above-mentioned parameter B1ThresholdRSRP or B1ThresholdRSRQ. In some scenarios, the first set of conditions may also involve that for a time interval starting when exceeding the threshold, the measured second signal strengths remain above the threshold. In some scenarios, the first set conditions may also define a hysteresis to be applied in connection with the threshold and the time interval. In this case, the first set of conditions may involve that for a time interval starting when exceeding the threshold plus the hysteresis value, the measured second signal strengths remain above the threshold minus the hysteresis value. In some scenarios the hysteresis value may be zero. The time interval of step 840 may correspond to the time interval defined by above-mentioned parameter TimeToTriggerB1.

An example of such first set of conditions are the above-described conditions to be fulfilled in detection of the B1 event.

The first set of conditions may be configured by the access node, e.g., using an RRC Resource Reconfiguration procedure as explained in connection with FIG. 4. The access node may thus send configuration information indicating the first set of conditions to the wireless device.

In some scenarios, in response to the receiving the first type of measurement report, the access node may configure the wireless device to set up a second radio connection to one of the second access nodes. The second radio connection would then be based on the second radio technology. The first radio connection and the second radio connection may then be used in a dual-connectivity configuration for communication between the wireless device and the wireless communication network.

At step 850, the access node configures the wireless device to, in response to expiry of a time interval without having sent the first type of measurement report, stop the measuring of the second signal strengths. This time interval may correspond to the time interval defined by the above-mentioned parameter MeasTime. The time interval of step 850 may be configured by the access node, e.g., using an RRC Resource Reconfiguration procedure as explained in connection with FIG. 4.

At step 860, the access node configures the wireless device to, in response to the measured first signal strengths satisfying a second set of conditions, send a second type of measurement report to the access node. The second set of conditions may involve that a change of the measured first signal strengths exceeds a further threshold. The further threshold may correspond to the threshold defined by above-mentioned parameter A7Offset. In some scenarios, the second set of conditions may also involve that, for a time interval starting when exceeding the further threshold, the change of the measured first signal strengths remains above the further threshold.

The time interval of step 860 may correspond to the time interval defined by above-mentioned parameter TimeToTriggerA7.

An example of such second set of conditions are the above-described conditions to be fulfilled in detection of the A7 event.

The second set of conditions may be configured by the access node, e.g., using an RRC Resource Reconfiguration procedure as explained in connection with FIG. 4. The access node may thus send configuration information indicating the second set of conditions to the wireless device.

At step 870, in response to receiving the second type of measurement report, the wireless device sends configuration information for restarting the measuring of the second signal strengths to the wireless device, e.g., using an RRC Resource Reconfiguration procedure as explained in connection with FIG. 4.

Figure 9:
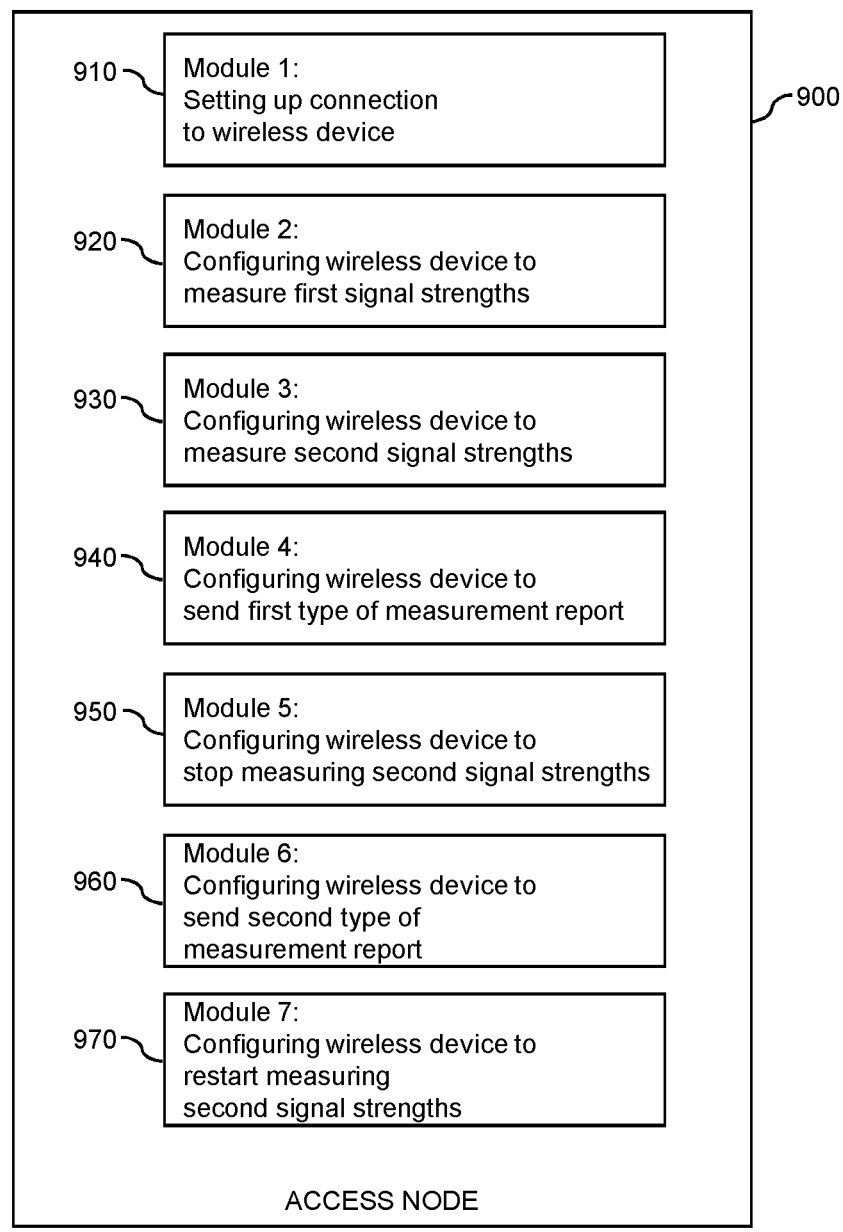
FIG. 9 shows a block diagram for schematically illustrating functionalities of an access node according to an embodiment.

FIG. 9 shows a block diagram for illustrating functionalities of an access node 900 which operates according to the method of FIG. 8. The access node 900 may for example correspond to one of the above-mentioned access nodes 101, 101-1, 101-2. As illustrated, the access node 900 may be provided with a module 910 configured to set up a connection to wireless device, such as explained in connection with step 810. Further, the access node 900 may be provided with a module 920 configured to configure the wireless device to measure first signal strengths, such as explained in connection with step 820. Further, the access node 900 may be provided with a module 930 configured to configure the wireless device to measure second signal strengths, such as explained in connection with step 830. Further, the access node 900 may be provided with a module 940 configured to configure the wireless device to send a first type of measurement report, such as explained in connection with step 840. Further, the access node 900 may be provided with a module 950 configured to configure the wireless device to stop measuring of the second signal strengths, such as explained in connection with step 850. Further, the access node 900 may be provided with a module 960 configured to configure the wireless device to send a second type of measurement report, such as explained in connection with step 860. Further, the access node 900 may be provided with a module 970 configured to send configuration information for restarting measuring the second signal strengths, such as explained in connection with step 870.

It is noted that the access node 900 may include further modules for implementing other functionalities, such as known functionalities of an eNB. Further, it is noted that the modules of the access node 900 do not necessarily represent a hardware structure of the access node 900, but may also correspond to functional elements, e.g., implemented by hardware, software, or a combination thereof.

Figure 7:
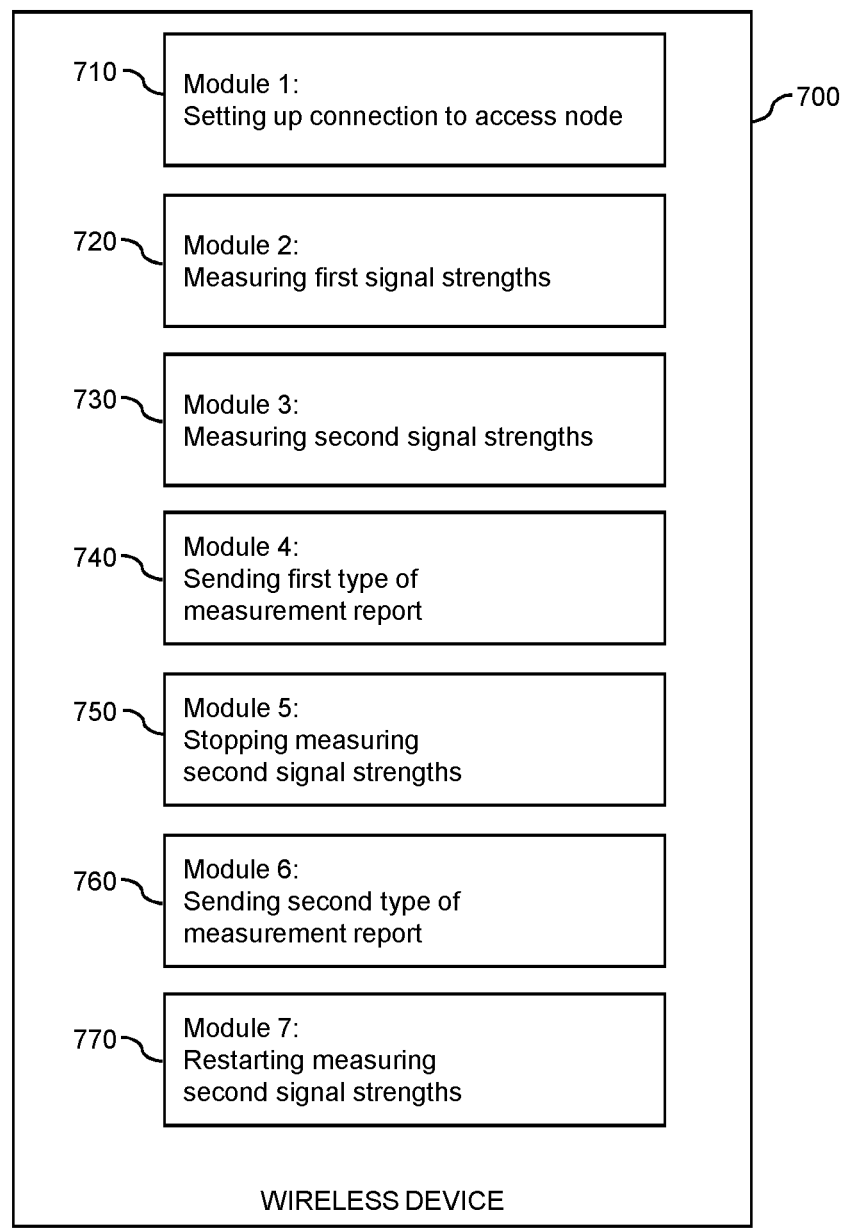
FIG. 7 shows a block diagram for schematically illustrating functionalities of a wireless device according to an embodiment.

It is noted that the functionalities as described in connection with FIGS. 6 and 7 could also be combined with the functionalities as described in connection with FIGS. 8 and 9, e.g., in system that includes at least one wireless device operating according to the method of FIG. 6 and an access node operating according to the method of FIG. 8. The latter access node would then correspond to the first access node of the method of FIG. 6.

Figure 10:
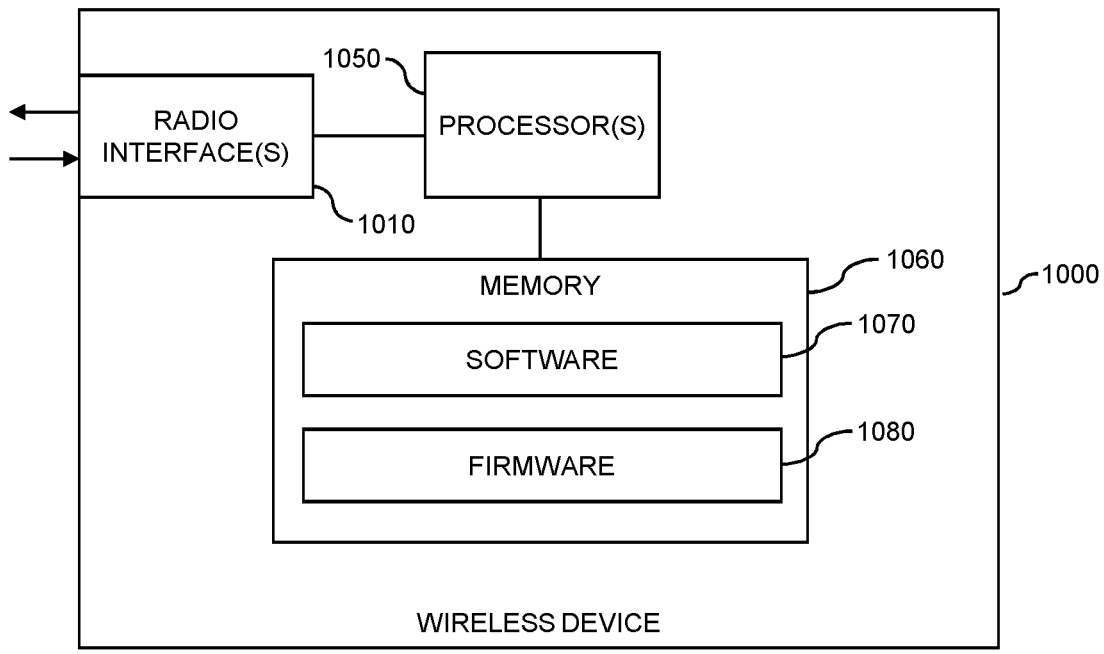
FIG. 10 schematically illustrates structures of a wireless device according to an embodiment.

FIG. 10 illustrates a processor-based implementation of a wireless device 1000 which may be used for implementing the above-described concepts. For example, the structures as illustrated in FIG. 10 may be used for implementing the concepts in the above-mentioned UE 10.

As illustrated, the wireless device 1000 includes one or more radio interfaces 1010. The radio interface(s) 1010 may for example be used for connecting to one or more access nodes of a wireless communication network. The radio interfaces 1010 may support multiple radio technologies, e.g., the LTE RAT and the NR RAT. Further, the interface(s) 1010 may be used for receiving configuration information from the wireless communication network and for sending measurement reports or event reports to the wireless communication network.

Further, the wireless device 1000 may include one or more processors 1050 coupled to the radio interface(s) 1010 and a memory 1060 coupled to the processor(s) 1050. By way of example, the radio interface(s) 1010, the processor(s) 1050, and the memory 1060 could be coupled by one or more internal bus systems of the wireless device 1000. The memory 1060 may include a Read-Only-Memory (ROM), e.g., a flash ROM, a Random Access Memory (RAM), e.g., a Dynamic RAM (DRAM) or Static RAM (SRAM), a mass storage, e.g., a hard disk or solid state disk, or the like. As illustrated, the memory 1060 may include software 1070 and/or firmware 1080. The memory 1060 may include suitably configured program code to be executed by the processor(s) 1050 so as to implement the above-described functionalities for managing a wireless communication network, such as explained in connection with FIG. 6 or 7.

It is to be understood that the structures as illustrated in FIG. 10 are merely schematic and that the wireless device 1000 may actually include further components which, for the sake of clarity, have not been illustrated, e.g., further interfaces or further processors. Also, it is to be understood that the memory 1060 may include further program code for implementing known functionalities of a UE or similar wireless device. According to some embodiments, also a computer program may be provided for implementing functionalities of the wireless device 1000, e.g., in the form of a physical medium storing the program code and/or other data to be stored in the memory 1060 or by making the program code available for download or by streaming.

Figure 11:
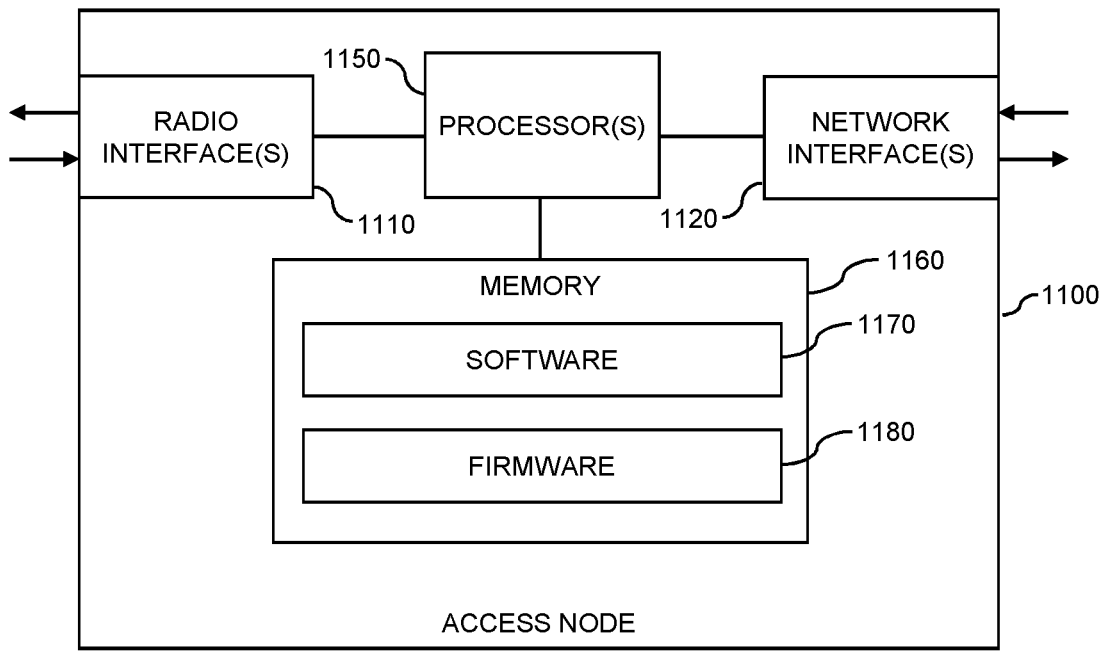
FIG. 11 schematically illustrates structures of an access node according to an embodiment.

FIG. 11 illustrates a processor-based implementation of an access node 1100 which may be used for implementing the above-described concepts. For example, the structures as illustrated in FIG. 11 may be used for implementing the concepts in one of the above-mentioned access nodes 101, 101-1, 101-2.

As illustrated, the access node 1100 includes one or more radio interfaces 1110. The radio interface(s) 1110 may for example be used for connecting to one or more wireless devices. The radio interfaces 1110 may support multiple radio technologies, e.g., the LTE RAT and the NR RAT. Further, the radio interface(s) 1110 may be used for sending configuration information to wireless communication devices and for receiving measurement reports or event reports from wireless devices. Further, the access node 1100 may include one or more network interfaces 1120. The network interface(s) 1120 may be used for communication with other nodes of the wireless communication network.

Further, the access node 1100 may include one or more processors 1150 coupled to the radio interface(s) 1110 and network interface(s) 1120, and a memory 1160 coupled to the processor(s) 1150. By way of example, the interface(s) 1110, 1120, the processor(s) 1150, and the memory 1160 could be coupled by one or more internal bus systems of the access node 1100. The memory 1160 may include a ROM, e.g., a flash ROM, a RAM, e.g., a DRAM or SRAM, a mass storage, e.g., a hard disk or solid state disk, or the like. As illustrated, the memory 1160 may include software 1170 and/or firmware 1180. The memory 1160 may include suitably configured program code to be executed by the processor(s) 1150 so as to implement the above-described functionalities of an access node, such as explained in connection with FIG. 8.

It is to be understood that the structures as illustrated in FIG. 11 are merely schematic and that the access node 1100 may actually include further components which, for the sake of clarity, have not been illustrated, e.g., further interfaces or further processors. Also, it is to be understood that the memory 1160 may include further program code for implementing known functionalities of an eNB or similar access node. According to some embodiments, also a computer program may be provided for implementing functionalities of the access node 1100, e.g., in the form of a physical medium storing the program code and/or other data to be stored in the memory 1160 or by making the program code available for download or by streaming.

As can be seen, the concepts as described above may be used for efficiently managing connectivity on the basis of multiple radio technologies, e.g., in an NR-NSA deployment. In an NR-NSA deployment, the illustrated concepts allow for providing a fair opportunity for the UEs to access the NR layer, hence enhancing the NR layer's usage due to the introduced relation between actual radio conditions using actual UE measurements, i.e., the measurements of the A7 event, and to restart of the NR measurements in a conditional manner. This may provide significant advantages as compared to performing NR measurements according to a periodic schedule. Further, the illustrated may allow for improving UE battery performance. Further, the illustrated may allow for improving the LTE capacity and throughput, because measurement gaps for performing NR measurements are needed. Further, the illustrated concepts may allow for more accurately controlling the UE's behavior by the existing LTE-NR B1 measurement configuration mechanism, which may help to reduce the signaling load. Further, the illustrated may allow for providing the operator of the wireless communication network with more accurate control of the UE's behavior, because parameters of the LTE-NR B1 measurement configuration mechanism can be better adapted to the actual conditions. Still further, the illustrated may allow for improving efficiency because already existing LTE measurements may be reused for detecting the A7 event.

It is to be understood that the examples and embodiments as explained above are merely illustrative and susceptible to various modifications. For example, the illustrated concepts may be applied in connection with various combinations of radio technologies, without limitation to the LTE RAT and NR RAT. Moreover, it is to be understood that the above concepts may be implemented by using correspondingly designed software to be executed by one or more processors of an existing device or apparatus, or by using dedicated device hardware. Further, it should be noted that the illustrated apparatuses or devices may each be implemented as a single device or as a system of multiple interacting devices or modules.

The invention claimed is:

1. A method of controlling connectivity to a wireless communication network, the method performed by a wireless device and comprising:
   setting up a first radio connection to a first access node of the wireless communication network, the first radio connection being based on a first radio technology;
   measuring first signal strengths of reference signals from access nodes operating on the basis of the first radio technology;
   measuring second signal strengths of reference signals from one or more second access nodes, the one or more second access nodes operating on the basis of a second radio technology;

in response to the measured second signal strengths satisfying a first set of conditions, sending a first type of measurement report to the first access node;
in response to expiry of a time interval without having sent the first type of measurement report, stopping said measuring of the second signal strengths;
in response to the measured first signal strengths satisfying a second set of conditions, sending a second type of measurement report to the first access node; and
in response to the sending of the second type of measurement report, receiving configuration information for restarting said measuring of the second signal strengths from the first access node.

2. The method according to claim 1, wherein the second set of conditions include that a change of the measured first signal strengths exceeds a first threshold.

3. The method according to claim 2, wherein the second set of conditions also include that, for a first time interval starting when exceeding the first threshold, the change of the measured first signal strengths remains above the first threshold.

4. The method according to claim 2, further comprising:
storing a value representing the first signal strengths when stopping said measuring of the second signal strengths; and
determining the change of the measured first signal strengths based on a difference of the measured first signal strengths to the stored value.

5. The method according to claim 1, wherein the first set of conditions include that the measured second signal strengths exceed a second threshold.

6. The method according to claim 5, wherein the second set of conditions also include that, for a second time interval starting when exceeding the second threshold, the measured second signal strengths remain above the second threshold minus a hysteresis value.

7. The method according to claim 1, further comprising, in response to the sending of the first type of measurement report, setting up a second radio connection to one of the second access nodes, wherein the second radio connection is based on the second radio technology.

8. The method according to claim 1, further comprising receiving configuration information from the first access node, wherein the configuration information indicates one or more of the following: the first set of conditions, and the second set of conditions.

9. The method according to claim 1, wherein one or more of the following applies:
the first radio technology is a Long Term Evolution (LTE) technology, and
the second radio technology is a New Radio (NR) technology.

10. A method of controlling a wireless communication network, the method being performed by an access node of the wireless communication network and comprising:
setting up a first radio connection to a wireless device, wherein the first radio connection is based on a first radio technology;
configuring the wireless device to measure first signal strengths of reference signals from access nodes that operate based on the first radio technology;
configuring the wireless device to measure second signal strengths of reference signals from one or more further access nodes that operate based on a second radio technology;
configuring the wireless device to perform the following operations:
in response to the measured second signal strengths satisfying a first set of conditions, send a first type of measurement report to the access node,
in response to expiry of a time interval without having sent the first type of measurement report, stop said measuring of the second signal strengths, and
in response to the measured first signal strengths satisfying a second set of conditions, send a second type of measurement report to the access node; and
in response to receiving the second type of measurement report from the wireless device, configuring the wireless device to restart said measuring of the second signal strengths.

11. The method according to claim 10, wherein the second set of conditions include that a change of the measured first signal strengths exceeds a first threshold.

12. The method according to claim 11, wherein the second set of conditions also include that, for a first time interval starting when exceeding the first threshold, the change of the measured first signal strengths remains above the first threshold.

13. The method according to claim 10, wherein the first set of conditions include that the measured second signal strengths exceed a second threshold.

14. The method according to claim 13, wherein the second set of conditions also include that, for a second time interval starting when exceeding the second threshold, the measured second signal strengths remain above the second threshold minus a hysteresis value.

15. The method according to claim 10, further comprising, in response to the receiving the first type of measurement report, controlling the wireless device to set up a second radio connection to one of the further access nodes, wherein the second radio connection is based on the second radio technology.

16. The method according to claim 10, further comprising sending configuration information to the wireless device, wherein the configuration information indicates one or more of the following: the first set of conditions, and the second set of conditions.

17. The method according to claim 10, wherein one or more of the following applies:
the first radio technology is a Long Term Evolution (LTE) technology, and
the second radio technology is a New Radio (NR) technology.

18. An access node configured for operation in a wireless communication network, the access node comprising:
at least one processor, and
a memory containing program code executable by the at least one processor, wherein execution of the program code by the at least one processor causes the access node to perform operations corresponding to the method of claim 10.

19. A wireless device configured for operation in a wireless communication network, the wireless device comprising:
at least one processor; and
a memory containing program code executable by the at least one processor, wherein execution of the program code by the at least one processor causes the wireless device to:
set up a first radio connection to a first access node of the wireless communication network, the first radio connection being based on a first radio technology;

measure first signal strengths of reference signals from access nodes operating on the basis of the first radio technology;

measure second signal strengths of reference signals from one or more second access nodes, the one or more second access nodes operating on the basis of a second radio technology;

in response to the measured second signal strengths satisfying a first set of conditions, send a first type of measurement report to the first access node;

in response to expiry of a time interval without having sent the first type of measurement report, stop said measuring of the second signal strengths;

in response to the measured first signal strengths satisfying a second set of conditions, send a second type of measurement report to the first access node; and in response to the sending of the second type of measurement report, receive configuration information for restarting said measuring of the second signal strengths from the first access node.

20. The wireless device according to claim 19, wherein:

the second set of conditions include that a change of the measured first signal strengths exceeds a first threshold; and execution of the program code by the at least one processor further causes the wireless device to:

store a value representing the first signal strengths when stopping said measuring of the second signal strengths; and determine the change of the measured first signal strengths based on a difference of the measured first signal strengths to the stored value.

* * * * *